United States Patent [19]

Iwata et al.

[11] 4,299,950

[45] Nov. 10, 1981

[54] UNSATURATED POLYESTER RESIN COMPOSITION

[75] Inventors: Riso Iwata, Tokyo; Atsuo Ishikawa, Kamakura; Hisataka Komai, Tokyo, all of Japan

[73] Assignee: Nippon Zeon Co. Ltd., Tokyo, Japan

[21] Appl. No.: 171,171

[22] Filed: Jul. 22, 1980

[30] Foreign Application Priority Data

Jul. 24, 1979 [JP] Japan ................................. 54-93892

[51] Int. Cl.$^3$ ............................................. C08G 63/52
[52] U.S. Cl. ............................... 528/306; 260/22 CB; 528/179; 528/192; 528/194; 528/247; 528/288; 528/299; 528/307
[58] Field of Search ............... 260/22 CB; 525/36, 40, 525/43, 49, 171; 528/179, 192, 194, 247, 288, 299, 306, 307

[56] References Cited

U.S. PATENT DOCUMENTS

| | | | |
|---|---|---|---|
| 3,347,806 | 10/1967 | Zimmermann | 525/17 |
| 4,029,848 | 6/1977 | Nelson | 525/49 |

FOREIGN PATENT DOCUMENTS

| | | | |
|---|---|---|---|
| 53-60984 | 5/1978 | Japan | 525/17 |
| 54-6099 | 1/1979 | Japan | 525/17 |
| 937980 | 9/1963 | United Kingdom | 525/17 |

*Primary Examiner*—J. Ziegler
*Attorney, Agent, or Firm*—Sherman & Shalloway

[57] ABSTRACT

A novel unsaturated polyester resin composition comprising an unsaturated alkyd and a crosslinkable vinyl monomer, said unsaturated alkyd being a modified unsaturated alkyd obtained by reacting a polybasic acid with a polyhydric alcohol in the presence of a cyclopentadiene-type oil having a viscosity at 25° C. of 50 to 50,000.

9 Claims, No Drawings

UNSATURATED POLYESTER RESIN COMPOSITION

This invention relates to a novel unsaturated polyester resin composition. More specifically, this invention relates to an unsaturated polyester resin composition having improved curability, shrinkage, viscosity characteristics and water resistance.

Unsaturated polyester resin compositions composed of an unsaturated alkyd and a crosslinkable vinyl monomer find wide applications in paints, castings, laminates, linings, decorative sheets and sealing materials because they generally have superior mechanical properties, electrical properties and chemical resistance and are relatively low-priced. Recently, they have gained acceptance as glass fiber-reinforced plastics for structural materials.

Despite these advantages, the unsaturated polyester resin compositions do have defects. For example, it has been pointed out that these compositions have poor curability, particularly, poor air-drying property, and shrink to a high ratio during curing. In other words, the unsaturated polyester resin compositions still have problems to be solved in that when such an unsaturated polyester resin composition is to be cured with a peroxide in the air, its surface in contact with the air does not sufficiently cure and shows tackiness, and because of its high shrinkage during curing, its internal stress increases to cause cracking of the cured product or impair its adhesion to glass fibers.

Various methods have been developed previously in order to improve the air-drying property of an unsaturated polyester resin composition. For example, it is known to modify an unsaturated alkyd with dicyclopentadiene ((British Pat. No. 937,980 and U.S. Pat. No. 3,347,806). According to this method, however, the reaction temperature must be maintained low in order to prevent dissociation of dicyclopentadiene during the reaction, and moreover, a problem of offensive odor arises. A method comprising modifying an unsaturated alkyd with a cyclopentadiene resin is also known (Japanese Laid-Open Patent Publications Nos. 60984/78 and 6099/79). This method has the defect that the types of the resin that can be used are limited, and the viscosity of the product rises.

Extensive investigations of the present inventors in order to remove the defects of the prior art have led to the discovery that when a low-molecular-weight cyclopentadiene-type oil is used instead of the dicyclopentadiene or the cyclopentadiene resin used in the prior art to modify the unsaturated alkyd, a modified unsaturated alkyd can be prepared at high temperatures irrespective of the type of the cyclopentadiene type oil, and that an unsaturated polyester resin composition prepared by using the modified unsaturated alkyd was improved in air curability, shrinkage during curing, viscosity characteristics and water resistance.

Thus, according to this invention, there is provided an unsaturated polyester resin composition comprising an unsaturated alkyd and a crosslinkable vinyl monomer, said unsaturated alkyd being a modified unsaturated alkyd prepared by reacting a polybasic acid with a polyhydric alcohol in the presence of a cyclopentadiene-type oil having a viscosity at 25° C. of 50 to 50,000 centipoises.

The cyclopentadiene-type oil used in this invention may be any cyclopentadiene-type oil which has a viscosity at 25° C. of 50 to 50,000 centipoise, preferably 100 to 30,000 centipoises. Usually, it is a homopolymer or copolymer containing at least 30% by weight, preferably at least 40% by weight, of a cyclopentadiene-type monomer. Usually, the cyclopentadiene-type oil comprises tri- to penta-mers as main ingredients, but it may contain polymers of higher degrees of polymerization if they are present in amounts which do not substantially impair the effects of this invention and the cyclopentadiene-type oil as a whole has a viscosity within the above-specified range.

The cyclopentadiene-type oil can be obtained by a known method, for example, by a method which comprises heat-polymerizing a cyclopentadiene-type monomer or a mixture of it with a comonomer in the presence or absence of an inert solvent such as benzene, toluene or xylene (for example, Japanese Laid-Open Patent Publication No. 98383/78), or a method which comprises cationically polymerizing the above monomer or monomeric mixture.

Examples of the cyclopentadiene-type monomer include cyclopentadiene, cyclopentadiene substituted by a lower alkyl group such as methyl or ethyl, Diels-Alder adducts such as their dimers and codimers, and mixtures of these. Examples of the comonomer include monoolefins such as ethylene, propylene, butene, pentene, styrene and alpha-methylstyrene; conjugated dienes such as 1,3-butadiene, isoprene, and 1,3-pentadiene; vinyl monomers having a polar group such as vinyl acetate, vinyl propionate, acrylic esters, methacrylic esters, acrylonitrile, acrolein and allyl alcohol; phenols such as phenol, cresol and hydroxystyrene; and drying oils or semi-drying oils such as linseed oil, tung oil and dehydrated castor oil.

The viscosity of the cyclopentadiene-type oil can be adjusted by properly selecting the polymerization conditions such as the reaction temperature and pressure or the conditions for separating and purifying the product in the process of producing the oil. In the present invention, the cyclopentadiene-oil used should have a viscosity within the above-specified range. If the viscosity of the cyclopentadiene oil is too high, general defects associated with the use of cyclopentadiene resins occur. For example, the viscosity of the product becomes high, and a gel is formed as a by-product. Moreover, the operation during the synthesis of the alkyd resin becomes complex because of the necessity of handling the solid resin.

Preferably, the content of the cyclopentadiene-type monomer unit in the cyclopentadiene-type oil is at least 30% by weight. As the content decreases beyond this limit, the effect of improving drying property and shrinkage of the unsaturated polyester resin composition decreases. There is no particular upper limit to this content. However, since it is difficult to obtain an oily product having a viscosity within the above-specified range by homopolymerization of the cyclopentadiene-type monomer, an oily copolymer containing 40 to 90% by weight of the cyclopentadiene-type monomer is used preferentially from the standpoint of economy. In the prior art involving using a cyclopentadiene-type resin, it has been thought that only vinyl monomers having an ester linkage or a hydroxyl group can be used as the comonomer. In the present invention, however, the cyclopentadiene-type oil can be used irrespective of the type of the comonomer.

In the present invention, a derivative obtained by modifying the cyclopentadiene-type oil in a customary manner can also be used as the cyclopentadiene-type oil. Examples are an acid-modified cyclopentadiene-type oil obtained by the addition of maleic anhydride or fumaric acid, and an alcohol-modified cyclopentadiene-type oil obtained by the addition of ethylene glycol, propylene glycol, etc. These derivatives produce the same effect as the unmodified cyclopentadiene-type oils.

In the composition of this invention, the modified alkyd synthesized in the presence of the cyclopentadiene-type oil is used as the unsaturated alkyd component. The modified alkyd is obtained in a customary manner except that the cyclopentadiene-type oil is used as an essential component, for example by reacting a polybasic acid, a polyhydric alcohol and the cyclopentadiene-type oil at 100° to 250° C. for about 5 to 10 hours. Generally, the ratio between the polybasic acid and the polyhydric alcohol in this reaction is such that the equivalent ratio of the alcohol to the carboxyl group or acid anhydride group is from 1.0 to 1.3.

In the prior art, when the unsaturated alkyd is modified with dicyclopentadiene, the reaction temperature is required to be strictly controlled in order to prevent formation of by-product cyclopentadiene by dissociation. In addition, even when such a control is exercised, the dissociation cannot be completely prevented, and the odor peculiar to dicyclopentadiene poses a safety and hygienic problem during the synthesis of alkyd resin. In contrast, no such defect occurs in the present invention since the cyclopentadiene-type oil is used instead of the dicyclopentadiene. According to the invention, the reaction of modifying an unsaturated alkyd can be performed with good efficiency under the desired reaction conditions.

The polybasic acid may, for example, be an alpha, beta-unsaturated dibasic acid or its anhydride such as maleic acid, maleic anhydride, fumaric acid, itaconic acid, and citraconic acid. If desired, it may be used in combination with another dibasic acid or its anhydride such as phthalic acid, tetrahydrophthalic acid, hexahydrophthalic acid, succinic acid, or the anhydrides thereof. As the polyhydric alcohol component, any polyhydric alcohols usually employed can be used in this invention. Examples include ethylene glycol, propylene glycol, diethylene glycol, butanediol, neopentyl glycol, glycerol, trimethylolpropane, and an ethylene oxide adduct of bisophenol A.

The proportion of the cyclopentadiene-type oil used in the synthesis of the modified alkyd is usually 5 to 50% by weight, preferably 10 to 40% by weight. If the amount of the cyclopentadiene-type oil is less than 5% by weight, the effect of improving the air-drying property of the unsaturated polyester composition is scarce. If, on the other hand, it exceeds 50% by weight, the strength, adhesion and flexibility of the cured product are deteriorated.

The crosslinkable vinyl monomer to be blended with the unsaturated alkyd in this invention includes, for example, styrene, alpha-methylstyrene and methyl methacrylate. The vinyl monomer is used generally in an amount of 20 to 50% by weight based on the total amount of it and the unsaturated alkyd.

The unsaturated polyester resin composition of this invention prepared as above cures easily by being mixed with a radical-generating peroxide and reacted at room temperature or at an elevated temperature in a customary manner. Accordingly, it can be used widely as a curable resin in paints, castings, laminates, linings, decorative sheets, sealing materials, etc. If desired, the composition of this invention may contain dryers of organometal salts, organic and inorganic pigments, fillers, etc. which are normally used in the art.

The following Examples and Referential Examples illustrate the present invention more specifically. All parts and percentages in these samples are by weight.

REFERENTIAL EXAMPLE 1

Each of the monomeric mixtures shown in Example 1 was heat-polymerized under the reaction conditions shown in Table b 1 in the presence of xylene solvent. Cyclopentadiene-type oils (A, B, C and D) were thus obtained.

TABLE 1

|  | Cyclopentadiene-type oil | | | |
|---|---|---|---|---|
|  | A | B | C | D |
| Reaction conditions | | | | |
| Temperature (°C.) | 260 | 260 | 260 | 190 |
| Time (hours) | 4 | 4 | 4 | 5 |
| Monomeric mixture (%) | | | | |
| Dicyclopentadiene | 60 | 50 | 55 | 80 |
| 1,3-Pentadiene | — | 50 | 30 | 20 |
| Vinyl chloride | 40 | — | 15 | — |
| Product | | | | |
| Viscosity at 25° (cps) | 20000 | 10000 | 5000 | 500 |

EXAMPLE 1

A four-necked flask was charged with 167 parts of propylene glycol, 98 parts of maleic anhydride and 148 parts of phthalic anhydride, and they were refluxed at 160° for 3 hours in a stream of nitrogen to esterify them until the acid value of the product became 100 to 150. Then, 90 parts of each of the cyclopentadiene-type oils shown in Table 2 was added (in Run No. 1-6, no cyclopentadiene oil was added, and in Run No. 1-5, a cyclopentadiene-type resin was added.). The mixture was heated to 200° C., and esterified while removing the resulting water and the unreacted propylene glycol under reduced pressure until the acid value of the product became 50 or below. Thus, a modified unsaturated alkyd was synthesized. Then, the product was cooled to 60° C., and 300 parts of styrene containing 0.2% of hydroquinone was added. In this manner, unsaturated polyester resins I to VI were prepared.

The viscosity at 25° C. of each of the resulting unsaturated polyester resin composition was measured. Ten grams of a sample of the resulting resin composition was put into an aluminum dish, and 1 part of methyl ethyl ketone peroxide and 0.5 part of cobalt naphthenate having a cobalt content of 6% were added per 100 parts of the sample. The mixture was allowed to stand at 25° C. for 5 hours, and its surface condition was examined by finger touch. The results are shown in Table 2.

TABLE 2

|  | Invention | | | | Control | |
|---|---|---|---|---|---|---|
| Run No. | 1-1 | 1-2 | 1-3 | 1-4 | 1-5 | 1-6 |
| Composition | I | II | III | IV | V | VI |
| Cyclopenta- | | | | | Cyclo-penta-diene | Not |
| diene oil added | A | B | C | D | resin (*1) | added |
| Viscosity at 25° C. (cps) | 300 | 300 | 300 | 300 | over 1000 | 250 |
| Surface con- | | | | | | |

TABLE 2-continued

| | Invention | | | | Control | |
|---|---|---|---|---|---|---|
| Run No. | 1-1 | 1-2 | 1-3 | 1-4 | 1-5 | 1-6 |
| Composition | I | II | III | IV | V | VI |
| dition (*2) | Good | Good | Good | Good | Poor | Fair |

(*1): The resin having a softening point of 125° C. obtained by heat-polymerizing a mixture of 70% of dicyclopentadiene and 30% of 1,3-pentadiene at 260° C. for 3 hours.
(*2): "Good" shows that the surface was not tacky; "Poor" shows that the surface was very tacky; and "Fair" shows that the surface was tacky.

It is seen from the results shown in Table 2 that the compositions of this invention (I to IV) have superior air-drying property, and also show superior handlability because their viscosity rise, if any, is only slight. On the other hand, the composition (V) containing an unsaturated alkyd modified with the cyclopentadiene-type resin rises strikingly in viscosity, and the unreacted resin bleeds on the surface, thus showing strong tackiness.

EXAMPLE 2

Cured products of the unsaturated polyester resin compositions I to VI prepared in Example 1 were tested for properties.

One part of benzoyl peroxide was dissolved in 100 parts by weight of each of the unsaturated polyester resin compositions. The solution was poured into a glass frame having a thickness of 3 mm, and reacted at 60° C. for 15 hours, and then at 110° C. for 2 hours to form a cast plate. The cast plate was machined to predetermined sizes to prepare specimens for testing the properties of the cured product. The results are shown in Table 3.

TABLE 3

| | Invention | | | | Control | |
|---|---|---|---|---|---|---|
| Run No. | 2-1 | 2-2 | 2-3 | 2-4 | 2-5 | 2-6 |
| Composition | I | II | III | IV | V | VI |
| Properties of the cured products | | | | | | |
| Heat distortion temperature (*1) (°C.) | 78 | 77 | 77 | 77 | 61 | 76 |
| Flexural strength (*2) (kg/mm²) | 6.0 | 6.3 | 6.5 | 6.5 | below 1.0 | 6.6 |
| Flexural modulus (2) (kg/mm²) | 390 | 385 | 395 | 300 | below 100 | 400 |
| Water resistance (water absorption (*3) (%) | 0.70 | 0.65 | 0.75 | 0.65 | 1.20 | 1.24 |
| Density (g/cm³) | 1.180 | 1.178 | 1.183 | 1.181 | 1.200 | 1.205 |
| Appearance of the cured products | Transparent | Transparent | Transparent | Transparent | Nontransparent | Transparent |

(*1): JIS K-7207;
(*2): JIS K-6911;
(*3): A test specimen, 20 mm × 50 mm × 3 mm, was boiled in water for 2 hours, and an increase in weight was determined.

It is seen from the results obtained that the compositions I, II, II and IV of this invention (Run Nos. 2-1, 2-2, 2-3 and 2-4) have markedly improved water resistance in the cured state and improved shrinkage (see the density of the cured product) during curing as compared with the composition VI (Run No. 2-6) containing an unmodified unsaturated alkyd.

It is also seen from Table 3 that the cured product of the composition V (Run No. 2-5) containing an unsaturated alkyd modified with the cyclopentadiene-type resin is non-transparent and has poor properties, especially mechanical strength. This is persumably because the compatibility and reactivity of the reactants used in the synthesis of the modified unsaturated alkyd are low.

What we claim is:

1. A cured product obtained from an unsaturated polyester resin composition comprising an unsaturated alkyd and a crosslinkable vinyl monomer, said unsaturated alkyd being a modified unsaturated alkyd obtained by reacting a polybasic acid with a saturated polyhydric alcohol in the presence of a cyclopentadiene-type oil having a viscosity at 25° C. of 50 to 50,000 centipoises the oil being present in an amount of 5 to 50% by weight.

2. The composition of claim 1 wherein said cyclopentadiene-type oil has a cyclopentadiene-type monomer content of at least 30% by weight.

3. The composition of claim 1 wherein said cyclopentadiene-type oil is obtained by heat polymerization.

4. The composition of claim 1 wherein said cyclopentadiene-type oil has a viscosity at 25° C. of 100 to 30,000 centipoises.

5. The composition of claim 1 wherein said cyclopentadiene-type oil has a viscosity at 25° C. of 500 to 20,000 centipoises.

6. The composition of claim 2 wherein said cyclopentadiene-type monomer is seleced from the group consisting of cyclopentadiene, methyl cyclypentadiene, ethyl cyclopentadiene, the dimers, codimers thereof and mixtures thereof.

7. The composition of claim 6 wherein said cyclopentadiene-type oil comprises from 40 to 90% by weight of the cyclopentadiene-type monomer and a comonomer selected from the group consisting of ethylene, propylene, butene, pentene, styrene, alpha-methylstyrene, 1,3-butadiene, isoprene, 1,3-pentadiene, vinyl acetate, vinyl propionate, vinyl chloride, acrylic esters, methacrylic esters, acrylonitrile, acrolein, allyl alcohol, phenol, cresol, hydroxystyrene, a drying oil and semi-drying oil.

8. The composition of claim 1 wherein the cross-linkable vinyl monomer comprises from 20 to 50% by weight of the total composition and wherein the modified unsaturated alkyd is obtained by reacting the polybasic acid and saturated polyhydric alcohol in the presence of 5 to 50% by weight of the cyclopentadiene-type oil.

9. The composition of claim 5 wherein the cyclopentadiene-type oil is obtained by heat-polymerizing from 50 to 80% by weight of dicyclopentadiene with a monomer selected from the group consisting of 1,3-pentadiene, vinyl chloride and mixtures thereof.

* * * * *